…

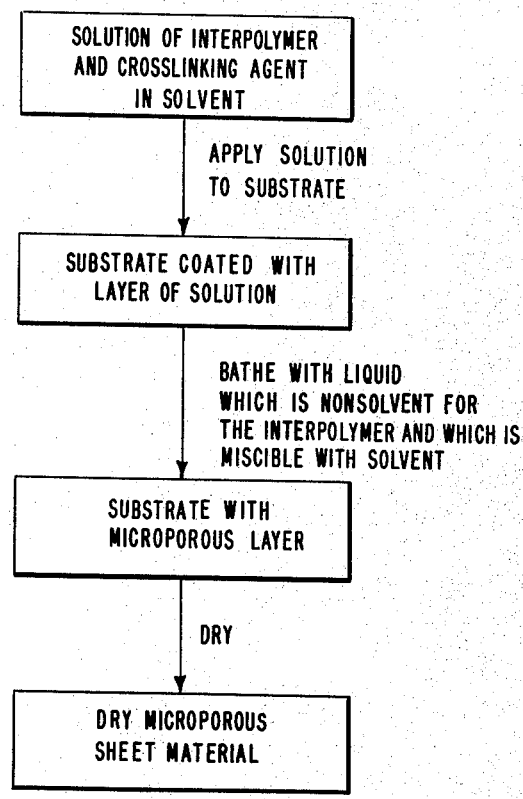

United States Patent Office 3,190,765
Patented June 22, 1965

---

3,190,765
VAPOR PERMEABLE SHEET MATERIAL AND METHOD OF MAKING SAME
Edward Lung Yuan, Cornwall on the Hudson, N.Y., assignor to E. I. du Pont de Nemours and Company, Wilmington, Del., a corporation of Delaware
Filed June 26, 1961, Ser. No. 119,322
17 Claims. (Cl. 117—63)

This invention relates to novel vapor permeable polymeric sheet materials and to a method of making the same. More particularly, the invention relates to polymeric films, either as unsupported membranous sheets or as coatings adherently united to fibrous substrates, which have a highly useful combination of properties including durability and microporosity, and in many cases excellent flexibility. Preferred embodiments of the invention concern the manufacture of a replacement for leather of the type used for shoe uppers and upholstery.

This application is a continuation-in-part of my earlier application S.N. 29,125 filed May 16, 1960, and now abandoned.

The drawing shows a flow diagram indicating the essential steps in the process of the invention.

The industries which produce such products from genuine leather as shoe uppers, upholstery and clothing have long been attempting to overcome certain problems associated with the use of leather. Like most products of natural origin, leather's properties vary from batch to batch and piece to piece. In addition, the size of the pieces obtainable is limited to the size of the animals from which the hides are taken. Thus, the production of large articles often involves costly piecing and matching. The usefulness of large pieces is often restricted by the presence of imperfections and blemishes such as cuts, spots, stains and scars.

Many unsuccessful attempts have been made to produce a man-made leather, or "leather replacement," which overcomes the limitations in the natural product and yet has similar durability, eye appeal and comfort characteristics. Prior attempts to make such a material have included methods wherein coatings of polymeric compositions are applied to porous fibrous substrates, and the coatings rendered porous by punching with needles in a needle-loom, by dissolving soluble particles contained in the coating, by drying and shrinking solvent-swollen particles contained in the coating, or by activating a blowing agent contained in the coating. In many cases, the method proposed was too slow or complicated for commercial use.

Some of the previous leather replacements had poor appearance, particularly those containing holes visible to the unaided eye, that is "macropores." Those having satisfactory flexibility were inclined to have inferior resistance to tearing, scuffing and abrasion, especially the type of abrasion resistance known as "edgewear resistance"; further discussion of the latter term appears in Example 1. And those having vapor permeability to the extent needed in shoe uppers were inclined to be too water absorbent for even brief outdoor wear in wet weather.

There has also been a need for new and improved sheet materials having a microporous cellular structure for such applications as filters, battery separators and roll coverings. Some applications require a stiff microporous sheet, others require a flexible type.

The primary object of this invention is to provide vapor-permeable polymeric sheet materials.

Another object is to provide a new and improved leather replacement material having a microporous outer surface structure or coating which is not only vapor permeable and highly flexible but also water repellent and abrasion resistant.

A further object is to provide a practical method for producing these materials.

Other important objects will be apparent from the description of the invention which follows.

In a broad sense, the objects of this invention are accomplished by the steps of:

(1) Applying to a substrate a layer of polymeric solution comprising (a) a substantially water-insoluble interpolymer containing combined free carboxyl (—COOH) ("carboxylic polymer"), (b) an organic solvent for said interpolymer which is at least partially water-miscible, and (c) a polyvalent metal oxide crosslinking agent;

(2) Bathing the layer with a water-containing liquid which is a nonsolvent for said interpolymer and is miscible with said organic solvent until the layer is coagulated into a cellular structure of interconnected micropores and the interpolymer therein is sufficiently crosslinked so that the layer is stabilized against subsequent collapse of the micropores, for example when the layer is dried; and (3) Drying the resultant stabilized microporous layer.

In a more specific sense, the invention also comprises adding other polymers to the carboxylic polymer solution and/or bringing the polymeric solution to the verge of gelling prior to layer formation by gradually admixing therewith substantially the maximum amount of liquid that can be added without actually gelling it, the liquid being a non-solvent for the carboxylic polymer and miscible with the organic solvent.

An essential component of the polymer solution is a substantially water-insoluble interpolymer containing combined free carboxyl. This interpolymer is sometimes referred to herein as the "carboxylic polymer." Such an interpolymer is the product of reacting at least one monomer containing both a carboxylic acid group and polymerizable olefinic unsaturation with at least one other monomer copolymerizable therewith.

The carboxylic polymer should ordinarily contain at least 0.001, preferably at least 0.005, chemical equivalents of combined or polymer-bound free carboxyl (—COOH) groups per 100 parts by weight of the polymer. The carboxyl content can be determined by titration of a solution of the polymer with alcoholic KOH to a phenolphthalein end-point or by complete chemical analysis of the polymer.

A skilled chemist, with the information given herein as a guide, can readily adjust the carboxyl group content of the layer to be bathed to enable the cellular structure of the layer to become stabilized during bathing. The carboxyl content of the polymer and the proportion of carboxylic polymer in the layer can both be varied to regulate the carboxyl content of the layer. The best carboxyl content of the layer to be employed in a given application will be governed to some extent by such process variables as the proximity of the layer-forming solution to the gel point and the bathing method to be used. For example, the polymer-bound carboxyl group content of the layer generally should be higher when the layer is formed from a solution that is not near its gel point than when the solution has first been brought to the verge of gelling. And the layer should usually contain more carboxyl groups when it is immediately immersed in the bathing liquid than when it is first treated with bathing liquid in the form of a vapor or spray.

The molecular weight of the carboxylic polymer should be high enough so that the polymer is a solid at room temperature, at least in the crosslinked and dried final product. The preferred polymers are solids before they are incorporated into the coating solution and have molecular weights well above 500, for example, upwards of 100,000.

Polymers which are completely insoluble in at least cold water are preferred for most shoe and garment type leather replacement applications, although a water solubility of up to 1 or 2% can be tolerated in some cases. Polymers having slightly greater cold water solubility are also useful in making filters and other products which can tolerate such solubility, or even for shoe uppers if blended with a major proportion of the polymer having little or no solubility in water. However, it is usually advisable to use polymers having less than 2% solubility in both cold and hot water in the interest of maintaining optimum porosity and durability of the polymer layer during and after the bathing operation.

Preferred leather replacement products are obtained when the carboxylic polymer is an elastomer or an extensible interpolymer of a monomer mixture comprising a carboxylic acid and a conjugated diene having 4–10 carbon atoms. Still more desirable leather replacements are obtained when the interpolymer forming monomer mixture also comprises a vinyl compound such as acrylonitrile, styrene, or an ester of acrylic or methacrylic acid formed from aliphatic alcohols having 1–12 carbon atoms.

It is usually best to use either methacrylic acid, acrylic acid or mixtures thereof as the monomer containing a carboxylic group for preparing the carboxylic polymer. Also useful, however, are other olefinically-unsaturated carboxylic acids possessing one or more olefinic carbon-to-carbon double bonds and one or more carboxyl groups. Preferably, the carboxylic acid should contain at least one activated olefinic carbon-to-carbon double bond of a type which readily functions in an addition polymerization. That is, it should contain either (1) a double bond in the alpha-beta position with respect to a carboxyl group (—CH=CH—COOH), or (2) a double bond attached to a terminal methylene grouping ($CH_2$=C<). The following exemplify members of the number (1) group: maleic acid, fumaric acid, crotonic acid, angelic acid, hydrosorbic acid, cinnamic acid, m-chlorocinnamic acid, p-chlorocinnamic acid, alpha-cyano cinnamic acid, umbellic acid, and other monoolefinic monocarboxylic acids; sorbic acid, alpha-methyl sorbic acid, alpha-ethyl sorbic acid, alpha-chloro sorbic acid, alpha-methyl-gamma benzal crotonic acid, beta-(2-butenyl) acrylic acid (2,4-heptadienoic-1), 2,4-pentadienoic acid, 2,4,6-octatrienoic acid, 1-carboxy-1-ethyl-4-phenyl butadiene-1,3, 2,6-dimethyl decatriene-(2,6,8)-oic-10, alpha-beta isopropylidene propionic acid, alpha-vinyl cinnamic acid, alpha-isopropenyl-furfural acetic acid, alpha-isopropenyl-cinnamenyl acrylic acid, and other polyolefinic monocarboxylic acids; hydromuconic acid, glutaconic acid, maleic acid, fumaric acid and other monoolefinic polycarboxylic acids; 3-carboxypentadiene-(2,4)-oic-1, muconic acid, and other polyolefinic polycarboxylic acids. The following exemplify members of the number (2) group: acrylic acid, alpha-chloro acrylic acid, methacrylic acid, ethacrylic acid, alpha-isopropylidene acrylic acid, alpha-styryl acrylic acid (2-carboxy-4-phenyl butadiene-1,3), beta-vinyl acrylic acid (1-carboxy butadiene-1,3), alpha vinyl acrylic acid, beta-acryloxy propionic acid, and others. I prefer to use a monoolefinic monocarboxylic acid having its olefinic double bond in the alpha-beta position with respect to the carboxyl group and containing a terminal methylene group.

The carboxyl groups can also be introduced into the essential interpolymer from a carboxyl-supplying reagent such as maleic anhydride or monosodium oxalate by the method disclosed in U.S. Patent 2,662,874 (e.g., in col. 3, line 34 and col. 4, line 8), or from a reagent containing groups hydrolyzable to carboxyl groups by the method disclosed in U.S. Patent 2,710,292. It does not matter how the carboxyl groups are introduced; it is only necessary that they be present in the interpolymer in sufficient amount to permit the desired stabilization via the crosslinking reaction in the bathing step.

The carboxylic acid or other carboxyl-supplying reagent is reacted with at least one additional monomer that is not a carboxylic acid, preferably a conjugated diene having 4–10 carbon atoms such as 1,3-butadiene, isoprene, piperylene, methylpentadiene, 2,3-dimethyl-1,3-butadiene, chloroprene and others. Derivatives of these dienes are also useful, such as the methoxy, ethoxy and cyano derivatives. For best results, a diene having 4–6 carbon atoms is used.

Typical of the other monomers which can be used in place of, or in addition to, the conjugated diene are acrylonitrile, methacrylonitrile and other acrylic nitriles, styrene, alpha-methylstyrene, other alkyl-substituted styrenes, methyl acrylate, ethyl acrylate, methyl methacrylate and other esters of acrylic or methacrylic acid formed from aliphatic alcohols having 1–12 carbon atoms, vinyl chloride and other vinyl halides, vinylidene chloride, vinyl acetate, methyl vinyl ketone, methyl isopropenyl ketone, methyl vinyl ether and the like.

The most highly preferred type of carboxylic polymer when the product is to be a tough flexible leather replacement material is a rubbery terpolymer of (1) a monoolefinic monocarboxylic acid having its olefinic double bond in the alpha-beta position with respect to the carboxyl group and containing a terminal methylene group, (2) a conjugated diene having 4–6 carbon atoms, and (3) a vinyl compound such as acrylonitrile, styrene or an ester of acrylic or methacrylic acid formed from an alcohol having 1–12 carbon atoms. I especially prefer a terpolymer of about 40–80% by weight of butadiene, 10–50% by weight of acrylonitrile and 2–25% of methacrylic acid or acrylic acid. Further description of such terpolymers and the methods by which they can be prepared are described in U.S. Patents 2,395,017 and 2,724,707, the disclosures of which are incorporated herein by reference. A preferred process for preparing them is described by H. P. Brown and C. J. Gibbs in "Carboxylic Elastomers," Rubber Chemistry and Technology, 28, p. 937 (1955).

The carboxylic polymers useful in this invention can be made by standard emulsion, solution and bulk polymerization techniques. The emulsion recipes used to prepare said interpolymers consist of the mixture of monomers, suitable emulsification and suspension agents, buffering agents for pH control and a free radical catalyst such as a peroxide such as benzoyl peroxide, hydroperoxide such as di-t-butyl peroxide, diazo such as azobisisobutyronitrile or redox such as persulfate-sulfite, or mixtures of such catalysts. Polymerization may be carried out in the presence of a free radical catalyst in a closed vessel in an inert atmosphere and under autogenous pressure or artificially induced pressure or in an open vessel under reflux at atmospheric pressure. The temperatures of the polymerization may be varied from 0° C. or lower to 100° C. or higher, more preferably from 20° C. to 90° C., depending to a large degree upon the activity of the monomers and catalyst used and the molecular weight desired in the polymeric product. The conditions and catalysts used in solution polymerization are similar to those used in the emulsion systems. Polymers made in solution are sometimes soluble end products and in some cases the polymers precipitate from the polymerization medium as they form. Bulk polymerizations are carried out by adding catalyst to the monomer mixture and causing them to polymerize in the absence of a diluent. Because of greater economy, ease of handling and general convenience, the emulsion type of polymerization is preferred.

A sufficient amount of polyvalent metal oxide crosslinking agent is blended with the carboxylic polymer to enable it to become crosslinked or cured in the bathing step to the extent necessary permanently to maintain the microporous cellular structure of the film or coating. About 5 to 10 parts by weight of the oxide per 100 parts by weight of the carboxylic polymer is usually sufficient. Zinc oxide is preferred, but calcium-, magnesium-, dibutyl tin-, lead-, barium-, cobalt-, tin-, or strontium oxide can also be used.

In the interest of achieving maximum strength and abrasion resistance in the product when the carboxylic polymer is one of the preferred elastomers made with a conjugated diene, it is usually preferred also to blend with the polymer a known curative for olefinic elastomers, preferably sulfur. Enough of this auxiliary curative is added to complete the cure of the stabilized layer of porous polymer upon its removal from the liquid bath and exposure to curing temperature in a dry heat zone.

The curatives can be blended with the carboxylic polymer by any known method, for example, on a standard rubber mill, Banbury mixer, or other conventional mixing or rubber milling device depending on the nature of the polymer. Alternatively, the curatives can be blended with a solution of the polymer. Other well-known additives, such as pigments, fillers, stabilizers, plasticizers and anti-oxidants, can also be blended with the polymer; this is preferably done prior to addition of the curatives.

The curative-containing polymer is dissolved in enough organic solvent to yield a solution having a viscosity suited to the method to be used in applying it to the substrate. The solvent should be miscible, preferably completely miscible, with the water or other liquid to be used in the bathing phase of the process. N,N-dimethyl formamide is a preferred solvent for the polymers soluble therein. Others which are useful include dimethyl sulfoxide, tetrahydrofuran, tetramethyl urea, N,N-dimethyl acetamide, N-methyl-2-pyrrolidone and gamma-butyrolactone. Also useful are blends of these solvents with various water-miscible liquids such as, for example, ketones, which alone are often poor solvents for the polymer. A blend of dimethyl formamide and methyl ethyl ketone is especially useful.

One or more polymers other than the preferred rubbery terpolymer or other carboxylic polymer described above can also be present in the polymer solution from which the microporous products of this invention are formed. In fact, the best product for a particular use is often made from a rubbery carboxylic polymer solution which also contains a vinyl chloride polymer and/or a polyurethane elastomer. Abrasion resistance of such products tend to be at a maximum when they contain a vinyl chloride polymer, that is, either polyvinyl chloride or a copolymer of a major proportion (preferably at least 80%) of vinyl chloride and a minor proportion of another ethylenically unsaturated monomer, for example vinyl acetate, vinylidene chloride, or diethyl maleate.

Polyurethane elastomers which are particularly useful components of the polymer solution are those prepared by chain-extending the reaction product of a polyalkyleneether glycol and an organic diisocyanate with a compound having two active hydrogen atoms attached to amino nitrogen atoms. When one of these elastomers is present, the resistance of the products to damage from repeated flexing is at its best. These elastomers can be prepared by first preparing a prepolymer by mixing the glycol with diisocyanate and heating at about 50 to 120° C. until a prepolymer is formed having terminal —NCO groups. Alternatively, the diisocyanate can be reacted with a molar excess of the glycol, and the product capped by reacting it with more diisocyanate.

Polyalkyleneether glycols used in the prepolymers usually have a molecular weight of about from 300 to 5000 and preferably 400 to 3000 and include, for example, polyethyleneether glycol, polypropyleneether glycol, polytetramethyleneether glycol, polyhexamethyleneether glycol, polyoctamethyleneether glycol, polynonomethyleneether glycol, polydecamethyleneether glycol, and mixtures thereof. Polyglycols containing several different radicals in the molecular chain, such as, for example, the compound $HO(CH_2OC_2H_4O)_nH$ wherein $n$ is an integer greater than 1, can also be used.

Aromatic, aliphatic and cycloaliphatic diisocyanates or mixtures thereof can be used in forming the prepolymers. Such diisocyanates are, for example, tolylene-2,4-diisocyanate, tolylene-2,6-diisocyanate, m-phenylene diisocyanate, biphenylene-4,4'-diisocyanate, methylene bis (4-phenyl isocyanate), 4-chloro-1,3-phenylene diisocyanate, naphthalene - 1,5 - diisocyanate, tetramethylene-1,4-diisocyanate, hexamethylene-1,6-diisocyanate, decamethylene-1,10-diisocyanate, cyclohexylene-1,4-diisocyanate, methylene bis(4-cyclohexylene isocyanate) and tetrahydronaphalene diisocyanate; arylene diisocyanates, that is, isocyanates in which the isocyanate groups are attached directly to the aromatic ring, are preferred. In general, they react more rapidly than do alkylene diisocyanates.

The prepolymer is chain extended with at least one compound having two active hydrogen atoms attached to aminonitrogen atoms, for example, one of the group consisting of hydrazine, substituted hydrazines and diamines, including both primary and secondary diamines. Examples of such chain-extending compounds are hydrazine, mono-substituted hydrazines, dimethyl piperazine, 4-methyl-m-phenylene diamine, m-phenylene diamine, 4,4'-diamino diphenylmethane or mixtures thereof. Hydrazine is the preferred chain extending agent.

The capped prepolymer having terminal isocyanate groups (—NCO) which is the reaction product of a glycol and an isocyanate contains urethane linkages (—OCONH—) and when this capped prepolymer is chain extended with hydrazine or a diamine having two active hydrogen atoms attached to amino nitrogen atoms, a polymer is formed having urea linkages (—HNCONH—)

which are sometimes referred to as a polyurea. The chain-extended polymers are also characterized as polyurethanes, i.e., they are chain-extended polyurethanes.

The chain extension reactions are usually carried out at a temperature below 120° C. and often, particularly for hydrazine-extended polymers, at about room temperature. The chain-extension reactions can be carried out without a solvent in heavy duty mixing equipment or they can be carried out in homogeneous solutions. When the reaction is carried out in solution, for convenience, one of the organic solvents which is employed in forming the microporous coatings can be used as a solvent. The chain-extension process just described usually yields a substantially linear polymer having a molecular weight of about from 5,000 to 300,000.

In addition to the above-described polyether-urethanes, polyester-urethanes are also useful; that is, a product of reacting a hydroxyl-terminated polyester with an organic diisocyanate and hydrazine or a diamine as previously listed. The polyester, for example, can be a product of reacting a glycol with an acid, an ester or an acid halide. The product of reacting 2 moles of adipic acid with 2.5 moles of pentanediol-1,5 is a most useful polyester. The vinyl chloride polymer: rubbery carboxylic polymer weight ratio in the polymer solution (and in the product) can be as high as about 50:50 when making leather replacement and higher yet in other cases. The polyurethane elastomer: rubbery carboxylic polymer weight ratio can be as high as about 99:1. Various additives commonly used in the coating art can be added to the polymer solution, such as plasticizers, viscosity modifiers, fillers and pigments.

In a preferred manner of practicing this invention, the polymer solution is brought to the verge of gelling before it is applied to a substrate. This is accomplished by gradually admixing with the solution a suitable treating liquid such as water or another liquid which is a nonsolvent for the carboxylic polymer and is miscible with the organic solvent in which the polymer is dissolved. I prefer to add the maximum, or nearly the maximum, amount of such treating liquid that can be added without gelling it. For example, the liquid is added in an amount of about 0.1–20% less than the amount required to "gel" the solution and thereby convert it to a jelly-like or gelatinous mass. In other words, the term "the verge of gelling" designates that point in the gradual addition of the treating liquid to the polymer solution at which the solution contains from 0.1% to about 20% less of the treating liquid than is required to gel the solution. This technique is especially advantageous when it is desired that the cellular structure of the product be as fine and as uniform as possible. This technique is also recommended whenever it is desired that the changes that occur in the layer during the first stage of the bathing step to follow should take place as rapidly as possible.

The amount of treating liquid required to bring a particular batch of polymer solution to the verge of gelling can be predetermined by measuring the minimum amount of treating liquid required to gel a small sample of the batch, and taking about 80 to 99.9% of the figure obtained as the basis for calculating the proportionate amount of liquid to be added to the batch in question.

Before the water or other treating liquid is added to the polymer solution, it is preferably blended with a substantial proportion, for example from about 2 to 5 times its own weight, of an organic solvent of the type used in preparing the polymer solution. Addition of the treating liquid to the solution should be done gradually and with stirring to prevent localized coagulation.

While water is usually the preferred treating liquid, other liquids which are non-solvents for the carboxylic polymer and are miscible with the organic solvent in which it is dissolved are also useful, for example ethylene glycol, glycerol, glycol monoethyl ether, hydroxyethyl acetate, and water miscible alcohols such as tertiary butyl alcohol.

Unexpectedly, polymer solutions containing at least one of the preferred carboxylic polymers are better adapted to being brought to the verge of gelling with water or other treating liquid than solutions in which it is absent, especially solutions of a vinyl chloride polymer and/or a polyurethane elastomer which contain no rubbery carboxylic polymer. Such carboxylic-polymer-free solutions have been found useful in the preparation of microporous films by a treating liquid addition and coagulation method similar to the method described above, but it has been difficult to bring such solutions to the verge of gelling without occasionally having the solution gel prematurely. Since the carboxylic polymer-containing solutions are less exacting with respect to the amount of treating liquid required to bring them to the verge of gelling, there is less danger of overshooting the desired endpoint and thereby gelling the solution. And if the amount of treating liquid added is less than about 90–95% of that required to gel the solution, there is much less tendency towards subsequent cell collapse than with the above-mentioned carboxylic-polymer-free polymeric solutions.

A layer of the polymer solution containing a carboxylic polymer, which solution may or may not be at the verge of gelling depending on the method employed, is applied to a substrate by any known coating method. Useful coating methods are exemplified by doctor-knifing, extruding, dipping, rolling and brushing.

Leather replacements and other composite reinforced microporous sheet products are produced by applying a layer of the carboxylic-polymer-containing solution to one or both sides of a flexible porous fibrous substrate, for example a non-woven fabric, a waterleaf, a woven fabric, leather, or a man-made leather-like sheet material. The fibers of the substrate can be natural or synthetic, crimped or straight, organic or inorganic, continuous filament or staple, or of papermaking length. When bathed and dried in accordance with the method of this invention, the layer of solution becomes a microporous polymeric layer integrally united to the fibrous substrate.

An unsupported flexible microporous film or sheet is obtained by applying the layer of solution to a removable substrate, preferably a smooth impervious substrate such as polished glass, stainless steel, aluminum foil, plastic film, or a fibrous substrate coated with release coating, followed by the requisite bathing, drying, curing and stripping operations.

The substrate-supported layer of polymer solution is preferably bathed with water, or a mixture of water and another liquid nonsolvent for the rubbery terpolymer which is miscible with water and the organic solvent in which the terpolymer is dissolved, such as ethylene glycol, glycerol and the like. Preferably, the solution layer is immediately immersed and soaked in water. However, the bathing operation can also be performed by subjecting the layer to a spray or a vapor of the bathing liquid, or by a combination of these and other known bathing methods. The term "bathing" as used throughout the specification and claims is intended to mean causing water or equivalent liquid, either as a liquid or a vapor, to come in contact with the polymeric layer.

In terms of what happens to the layer applied to the substrate, the bathing operation can be considered to comprise three stages. These are: (1) coagulation, accompanied by formation of a cellular structure of intercommunicating micropores throughout the layer; (2) solvent removal; and (3) crosslinking of the carboxylic polymer with resultant stabilization of the cellular structure. At least portions of these stages may occur simultaneously. In the first stage, coagulation is usually substantially complete in from about 0.5 to 5 minutes with wet layers less than 40 mils thick. The coagulated gelatinous layer has a microporous cellular structure throughout its thickness, and already has sufficient toughness to withstand considerable handling. For example, in the manufacture of an unsupported microporous film, the coagulated layer can be stripped from the removable substrate at this point. Thus, the method is adaptable to the production of unlimited lengths of microporous film.

In the second, or solvent removal stage of bathing, the gelatinous cellular polymeric layer is bathed with enough liquid and for a sufficient period of time to remove therefrom all or practically all of the organic solvent. If any substantial amount of solvent is allowed to remain in the layer, it may cause substantial or total loss of porosity due to collapse of the cellular structure in the steps which follow.

The bathing liquid used in the first two stages of bathing should be at about room temperature, preferably about 18 to 22° C. On the other hand, the third, or crosslinking, stage of the bathing operation is often accomplished most efficiently with hot liquid, particularly with the preferred rubbery interpolymers. For example, with bathing liquid at about 80 to 100° C., crosslinking is complete in a few minutes, whereas, with liquid at about 18 to 22° C., crosslinking time is typically about 10 to 20 hours.

It is believed that the crosslinking of the carboxylic polymer in the cellular layer during bathing results from a reaction between the carboxyl groups of the polymer and the polyvalent metal oxide blended therewith. The crosslinking reaction takes place at an accelerated rate in the presence of the water in the bathing liquid. And surprisingly enough, the reaction is not only harmless to the microporous cellular structure, but actually stabilizes it to the extent that it is retained after the structure is dried and oven cured. This is most unexpected with respect to "soft" types of carboxylic polymers, that is, the types having an initial modulus below 0.9 gram per denier. Until the present invention, cell collapse has been a major obstacle to the manufacture of microporous sheet material by liquid coagulation techniques from soft polymers, especially those which are soft enough to be distinctly extensible, rubbery or elastomeric.

A satisfactory degree of crosslinking is indicated when the bathed layer withstands the drying and oven curing steps without collapse of a substantial portion of the cell structure as observed under a microscope or as measured in a vapor permeability test. Control of the crosslinking stage can be accomplished by forming and drying a test sample, and correcting any excessive cell collapse should it occur by using hotter bathing liquid or more time in the crosslinking stage and/or by increasing the proportion of polyvalent metal oxide crosslinking agent in the polymer composition.

Next, the bathed and stabilized layer is dried, preferably in a heat zone in which there is forced air circulation.

The best durability properties are usually achieved with the preferred diene-coating interpolymers by further curing, preferably completely curing, the interpolymer layer. This can be accomplished by heating it in an oven or other type of heat zone at curing temperature until the interpolymer has reacted with metal oxide and/or sulfur (or other auxiliary curative) present therein.

The method of the present invention and the products thereof have important advantages which will be readily apparent to persons familiar with the art of making microporous films, leather replacements and leather products. The method is adaptable to the rapid and economical manufacture of unlimited quantities and sizes of microporous sheet products.

The unsupported microporous polymeric films obtainable by this method are not only durable and water repellent, but also substantially free of macropores and blemishes. Since the product has a substantially macropore-free structure of intercommunicating micropores (pores not readily seen by the unaided eye) throughout its thickness, it has high permeability to vapors and relatively low permeability to liquids. Thus, it is breathable yet water repellent. Filter media, raincoats, battery separators, roll coverings and special types of gloves are typical of the products for which the unsupported film is useful.

When these novel microporous films are integrally united during or after their formation to fibrous substrates, leather-like sheet materials can be obtained having substantial advantages over prior leather replacements as well as over genuine leather for many applications. For example, shoe-upper leather-replacement is obtainable which combines leather-like appearance, durability and comfort characteristics with freedom from the wide periodic fluctuation in cost and variation in properties which is known to characterize genuine leather. Moreover, the availability of the product in continuous lengths and any desired width in substantially uniform and blemish-free quality gives it a distinct advantage over leather for such applications as upholstery, luggage, table and roll coverings, ink rollers and sport jackets.

The novel microporous films and coated substrates can be as soft as chamois or suede or as hard as the stiffest, most scuff resistant leathers depending on the type and amount of modifying polymer and other additives present.

In the following examples, which are given for the purpose of illustrating the invention, all quantities are on a weight basis unless otherwise indicated.

EXAMPLE 1

The following composition is blended on a two-roll rubber mill:

| | Parts by weight |
|---|---|
| Carboxylic polymer * | 100.0 |
| Zinc oxide | 5.0 |
| Sulfur | 0.5 |
| Accelerator (tetramethyl-thiuram disulfide) | 1.5 |
| Antioxidant [2,2 methylene bis (4 methyl 6 tertiary butyl phenyl)] | 2.0 |
| | 109.0 |

* The rubbery terpolymer product of copolymerizing 69 parts butadiene, 26.5 parts acrylonitrile and 4.5 parts methacrylic acid.

A 25% solution of the above milled composition in dimethyl formamide and a 10% solution of polyvinyl chloride in dimethyl formamide are blended in sufficient proportions to yield a polymeric solution in which the rubbery terpolymer:polyvinyl chloride weight ratio is 65:35.

Next, 21 parts of a solution composed of 20% water and 80% dimethyl formamide is slowly added to 100 parts of the polymeric solution with stirring. Thus, by adding about the maximum amount of water that can be added to the solution without actually gelling it, the solution is brought to the verge of gelling.

Most of the entrapped bubbles in the polymeric solution are removed by subjecting the solution to subatmospheric pressure in a vacuum chamber. Any large particles which may be present, such as gelled polymer particles, are removed from the solution by filtering it through cheese cloth.

A layer of the filtered polymeric solution is applied by means of a doctor knife to one side of a porous nonwoven fibrous substrate, described below, to a wet film thickness of about 65 mils. The coating operation is carried out in a zone having a temperature of 21° C. and a relative humidity of 20%.

The fibrous substrate is a polyurethane elastomer impregnated nonwoven fabric prepared as described in Example 1 of U.S. patent application S.N. 835,431 filed August 24, 1959, and now Patent 3,067,483.

The layer of polymeric solution applied to the fibrous substrate is coagulated by floating the coated material coating side down on a body of water at 16° C. for 30 seconds, followed by completely immersing it in the water for 30 minutes to remove most of the dimethyl formamide. The resulting bathed gelatinous polymeric layer has an intercommunicating microporous cellular structure.

The rubbery terpolymer in the gelatinuous layer is partially cured without damage to the cellular structure by immersing the coated material in water at 80–90° C. for 20 minutes. Then the coated material is immersed in water at 16° C. for one hour to insure substantially complete removal of dimethyl formamide.

Solvent-free, and with the cellular structure of the coating stabilized against collapse, the coated material is dried in a 100° C. heat zone. The cure of the rubbery terpolymer in the coating is completed by heating the coated material in a 150° C. oven for 30 minutes.

The resulting product, which consists of a porous fibrous substrate integrally united to a cured, tough and flexible microporous polymeric coating about 12 mils thick, has a water vapor permeability value of over 10,000. This value, also referred to as LPV (leather permeability value), is measured by the test described by Kanagy and Vickers in the Journal of the Leather Chemists Association, 45, 211–242, April 19, 1950.

The product is useful as a leather replacement material for shoe uppers, upholstery, handbags, jackets, caps, hat linings and bearings.

Especially important properties of the product with respect to its utility as a shoe-upper material are: (a) its comfort characteristics such as flexibility, softness on the foot-contacting fibrous substrate side, breathability, and capacity to repel water when worn in the rain; (b) its appearance and finishing characteristics, including the absence of macropores throughout the thickness of the coating, thus allowing the surface to be subjected to such finishing operations as napping, buffing, polishing, staining and embossing without danger of exposing unsightly holes; (c) its durability, including resistance to tearing, repeated flexing and abrasion.

The type of abrasion resistance known as "edgewear resistance" is highly important in a shoe-upper material. A convenient method of measuring edgewear resistance is to rub the folded edge of a sample of the material against dry #10 cotton duck (canvas) under a 10 pound load at the rate of 50 back-and-forth strokes a minute, each half of the stroke measuring about 6 inches. Failure at any given number of strokes is indicated by appreciable wear and noticeable roughening of the folded edge. When the coated surface of the product of this example is tested in this manner, its edgewear resistance is found to be over 2000. Most of the prior leather replacement candidates for shoe-upper use, particularly those based on cellular elastomeric compositions, fail at well below 2000 strokes, usually even below 1000 strokes.

If Example 1 is repeated except that instead of immersing the coagulated coating in water at 80–90° C. for 20 minutes it is immersed in water at 16° C. for 2 hours, a non-porous and therefor a non-breathable product is obtained. The 2-hour immersion in cold water does not stabilize the cellular structure of the coating against collapse in the subsequent heating steps.

EXAMPLE 2

A leather replacement material having similar properties and utility to the product of Example 1 is made by repeating Example 1 with the following exception: the rubbery terpolymer in the coagulated coating is partially cured in cold water instead of hot water by immersion of the coated material in water at 16° C. for 20 hours. The 20-hour immersion in cold water did partially cure the terpolymer to the extent necessary to stabilize the cellular structure of the coating against collapse in the subsequent heating steps.

EXAMPLE 3

A 15% solution of the milled rubbery terpolymer composition described in Example 1 is prepared. A layer of the solution is applied to one side of a cotton sheeting running 2.40 yards per pound per 60 inch width. The layer of solution which has a wet film thickness of about 30 mils, is coagulated, bathed, partially cured, dried and cured in the same manner as in Example 1.

The resulting product, which consists of a porous woven fabric substrate integrally united to a flexible but tough microporous elastomeric coating, has an LPV of over 10,000. It is useful as a leather replacement material in general and as a raincoat and upholstery material in particular.

EXAMPLE 4

A 20% solution of polyurethane elastomer is prepared by first mixing 3343 parts of polytetramethyleneether glycol of about 1000 molecular weight with 291 parts of tolylene-2,4-diisocyanate and heating the mixture for 3 hours at 90° C. 2485 parts of the resulting hydroxyl-end-group-containing dimer are mixed with 570 parts of methylene bis-(4-phenyl isocyanate). This mixture is heated for one hour at 80° C., yielding a prepolymer with isocyanate end groups. The prepolymer is dissolved in 10,000 parts of dimethyl formamide, and the resultant solution is added slowly to a solution consisting of 50 parts of hydrazine hydrate and 0.5 part dibutylamine dissolved in 1710 parts of dimethyl formamide.

The 20% solution of chain extended polyurethane prepared above is blended with the 25% solution of milled rubbery terpolymer composition and the 10% solution of polyvinyl chloride described in Example 1 in sufficient proportions to yield a polymeric solution in which the rubbery terpolymer:polyvinyl chloride:polyurethane weight ratio is 35:30:35.

Next, 19 parts of a solution composed of 20% water and 80% dimethyl formamide is slowly added to 100 parts of the polymeric solution with stirring, thereby bringing the polymeric solution to the verge of gelling.

A leather replacement material having similar properties and utility to the product of Example 1 is made by repeating Example 1 except for the substitution of the above-prepared polymeric solution for the one used in that example.

The product of this example has even better resistance to damage by repeated flexing than the product of Example 1.

EXAMPLE 5

An unsupported membranous microporous sheet or film which is useful as a battery separator or as a filter is prepared from the blended polymeric solution described in Example 1. A layer of the solution is cast onto one side of a polished sheet of stainless steel to a wet film thickness of about 30 mils. The layer of polymeric solution is coagulated, bathed, partially cured, dried and cured in the manner described in Example 1, followed by removal of the cured microporous film from the stainless steel substrate. The film is simply lifted or peeled from the substrate.

In a modification of Example 5, the partially cured film is removed from the steel substrate and subsequently dried and cured.

EXAMPLE 6

A rubbery terpolymer of 5 parts methacrylic acid 75 parts butadiene and 20 parts acrylonitrile is prepared by first placing in a reaction vessel an aqueous solution consisting of 200 parts water, 4 parts emulsifying agent (a sodium salt of an alkylaryl sulfonate), 0.02 part chelating agent (ethylenediaminetetracetic acid) and 0.5 part catalyst (potassium persulfate). Stepwise, the following are then added to the reaction vessel: 0.8 part modifier (mixed tertiary $C_{12}$–$C_{16}$ mercaptans), 20 parts acrylonitrile and 5 parts methacrylic acid. After purging the reaction vessel to remove air, 75 parts liquid butadiene are added. While heating the reaction vessel to 50° C., the reaction mixture is agitated to form an emulsion. When the polymerization reaction reaches substantially complete conversion, the agitation is stopped and the unreacted monomers and water are removed by vacuum stripping.

The composition described in the first paragraph of Example 1 is prepared on a two-roll rubber mill except for the substitution of the rubbery carboxylic terpolymer prepared immediately above for the one used in Example 1. A 15% solution of the resulting composition in dimethyl formamide is prepared, and a 30 mil layer of the solution is applied to one side of a cotton sheeting running 2.40 yards per pound per 60 inch width. The layer of terpolymer solution is bathed, dried and cured in the manner described in Example 1.

The product, a flexible, microporous, vapor-permeable sheet material, is useful in garment and upholstery applications.

Similar products are obtained by repeating Example 6 with each of the rubbery carboxylic polymers shown in Table I as the sole polymeric component.

Table I.—Composition of rubbery carboxylic polymer, percent by weight 5 methacrylic acid, 94 butadiene, 1 acrylonitrile
10 methacrylic acid, 89 butadiene, 1 acrylonitrile
14 methacrylic acid, 74 butadiene, 12 acrylonitrile
39 methacrylic acid, 60 butadiene, 1 acrylonitrile
5 methacrylic acid, 75 butadiene, 20 methyl methacrylate
5 sorbic acid, 75 butadiene, 20 acrylonitrile
5 acrylic acid, 75 butadiene, 20 acrylonitrile
5 cinnamic acid, 75 butadiene, 20 acrylonitrile
5 methacrylic acid, 75 chloroprene, 20 acrylonitrile
5 methacrylic acid, 75 butadiene, 10 acrylonitrile, 10 styrene

EXAMPLE 7

An interpolymer of 3 parts methacrylic acid, 3 parts acrylic acid and 94 parts ethyl acrylate is prepared by first placing in a reaction vessel an aqueous solution consisting of 140 parts water, 2 parts sodium decyl benzene sulfonate and 1 part polyalkylated naphthalene sulfonate ("Daxad 11"). To this solution are added (1) enough sulfuric acid to give a pH of 4.0 and (2) half of a mixture of monomers having the composition indicated in the beginning of this paragraph. Next, a catalyst solution consisting of 0.2 part potassium persulfate in water is added, followed by increment-wise addition of the remainder of the monomer mixture over a period of 10 hours. The reaction proceeds at a temperature of 50° C. to a yield of about 88% in 21 hours. The polymer latex is coagulated; the coagulation is washed several times with 3% HCl solution and then with clear water until acid-free; finally, the polymer is dried.

Example 6 is repeated except (a) the carboxylic interpolymer just prepared is used in place of the carboxylic polymer used in that example, and (b) a 90:10 blend of acetone and dimethyl formamide is used in making up the 15% solution of polymer. The microporous product is useful as a leather replacement material.

Similar products are obtained by repeating Example 7 with each of the carboxylic polymers shown in Table II as the sole polymeric component. The polymer of Example 7 and the polymers listed in Table II have a molecular weight of about 200,000.

Table II.—Composition of carboxylic polymer, percent by weight 5 methacrylic acid, 5 acrylic acid, 88 ethyl acrylate, 2 divinyl benzene
8.6 methacrylic acid, 91.4 butadiene
10 methacrylic acid, 55 butadiene, 35 acrylonitrile
5 acrylic acid, 95 butadiene
30 acrylic acid, 70 butadiene
10 methacrylic acid, 75 butyl acrylate, 15 acrylonitrile
2.6 methacrylic acid, 77 butadiene, 15.4 styrene, 5 maleic acid monobutylester
5 methacrylic acid, 47 butyl acrylate, 48 styrene
10 methacrylic acid, 20 ethyl acrylate, 70 styrene
5 methacrylic acid, 60 butyl acrylate, 35 acrylonitrile

I claim:

1. A method of making microporous sheet material which comprises (1) applying to a substrate a layer of polymeric solution comprising (a) a substantially water-insoluble interpolymer containing combined free carboxyl, (b) a water-miscible organic solvent for said interpolymer, and (c) a polyvalent metal oxide cross-linking agent; (2) bathing the layer with a water-containing liquid which is a nonsolvent for said interpolymer and is miscible with said organic solvent until the layer is coagulated into a cellular structure of interconnected micropores and is stabilized against collapse of the micropores; and (3) drying the bathed layer.

2. A method as defined in claim 1 wherein said interpolymer is the product of reacting a carboxylic acid with a copolymerizable monomer selected from the group consisting of conjugated dienes having 4–10 carbon atoms, acrylic nitriles, styrene, alkyl-substituted styrenes, esters of acrylic acid and methacrylic acid formed from aliphatic alcohols having 1–12 carbon atoms, vinyl halides and vinyl acetate.

3. A method as defined in claim 1 wherein said interpolymer is the rubbery product of reacting (a) a monoolefinic monocarboxylic acid having its olefinic double bond in the alpha-beta position with respect to the carboxyl group and containing a terminal methylene group, (b) a conjugated diene having 4–6 carbon atoms and (c) an acrylic nitrile.

4. A method as defined in claim 3 wherein said interpolymer is the rubbery product of reacting (a) 2–25% by weight of a monomer selected from the group consisting of methacrylic acid and acrylic acid, (b) 40–80% by weight of butadiene and (c) 10–50% by weight of acrylonitrile.

5. A method as defined in claim 1 wherein said polymeric solution contains about 15–25% solids and comprises at least one polymer selected from the group consisting of vinyl chloride polymers and polyurethane elastomers.

6. A method as defined in claim 1 wherein said polymeric solution is brought to the verge of gelling before it is applied to the substrate by admixing therewith substantially the maximum amount of liquid that can be added without actually gelling it, said liquid being a nonsolvent for said interpolymer and miscible with said organic solvent.

7. A method as defined in claim 1 wherein said substrate is a flexible porous fibrous material, and the dried microporous layer is integrally united thereto.

8. A method as defined in claim 1 wherein said substrate is a smooth-surfaced impervious material, and the microporous polymeric layer formed thereon is removed therefrom.

9. A method as defined in claim 1 wherein the bathing liquid is at a temperature substantially above normal room temperature during at least part of said bathing step.

10. A method as defined in claim 3 wherein the polymeric solution also contains sulfur, and the bathed layer is heated until the rubbery interpolymer therein is fully cured.

11. A vapor-permeable sheet material comprising a microporous polymeric film which film comprises the product of reacting in the presence of water a substantially water-insoluble interpolymer containing combined free carboxyl with a polyvalent metal oxide cross-linking agent.

12. An article as defined in claim 11 wherein said interpolymer in the product of reacting a carboxylic acid with a copolymerizable monomer selected from the group consisting of conjugated dienes having 4–10 carbon atoms, acrylic nitriles, styrene, alkyl-substituted styrenes, esters of acrylic acid and methacrylic acid formed from aliphatic alcohols having 1–12 carbon atoms, vinyl halides and vinyl acetate.

13. An article as defined in claim 11 wherein said interpolymer is the product of reacting (a) a monoolefinic monocarboxylic acid having its olefinic double bond in the alpha-beta position with respect to the carboxyl group and containing a terminal methylene group, (b) a conjugated diene having 4–6 carbon atoms and (c) an acrylic nitrile.

14. An article as defined in claim 11 wherein said interpolymer is the product of reacting (a) 2–25% by weight of a monomer selected from the group consisting of methacrylic acid and acrylic acid, (b) 40–80% by weight of butadiene and (c) 10–50% by weight of acrylonitrile.

15. An article as defined in claim 11 wherein said polymeric film also comprises at least one polymer selected from the group consisting of vinyl chloride polymers and polyurethane elastomers.

16. An article as defined in claim 11 wherein said polymeric film is integrally united to a flexible porous fibrous sheet material.

17. An article as defined in claim 13 wherein said polymeric film is integrally united to a nonwoven substrate.

References Cited by the Examiner

UNITED STATES PATENTS

| | | | |
|---|---|---|---|
| 2,724,707 | 11/55 | Brown | 260—80.7 |
| 2,826,509 | 3/58 | Sarbach | 117—10 |
| 2,848,752 | 8/58 | Bechtold | 117—135.5 |
| 3,000,757 | 9/61 | Johnson et al. | 117—135.5 XR |
| 3,067,482 | 12/62 | Hollowell | 117—63 XR |

WILLIAM D. MARTIN, *Primary Examiner.*

RICHARD D. NEVIUS, *Examiner.*